United States Patent Office 3,442,801
Patented May 6, 1969

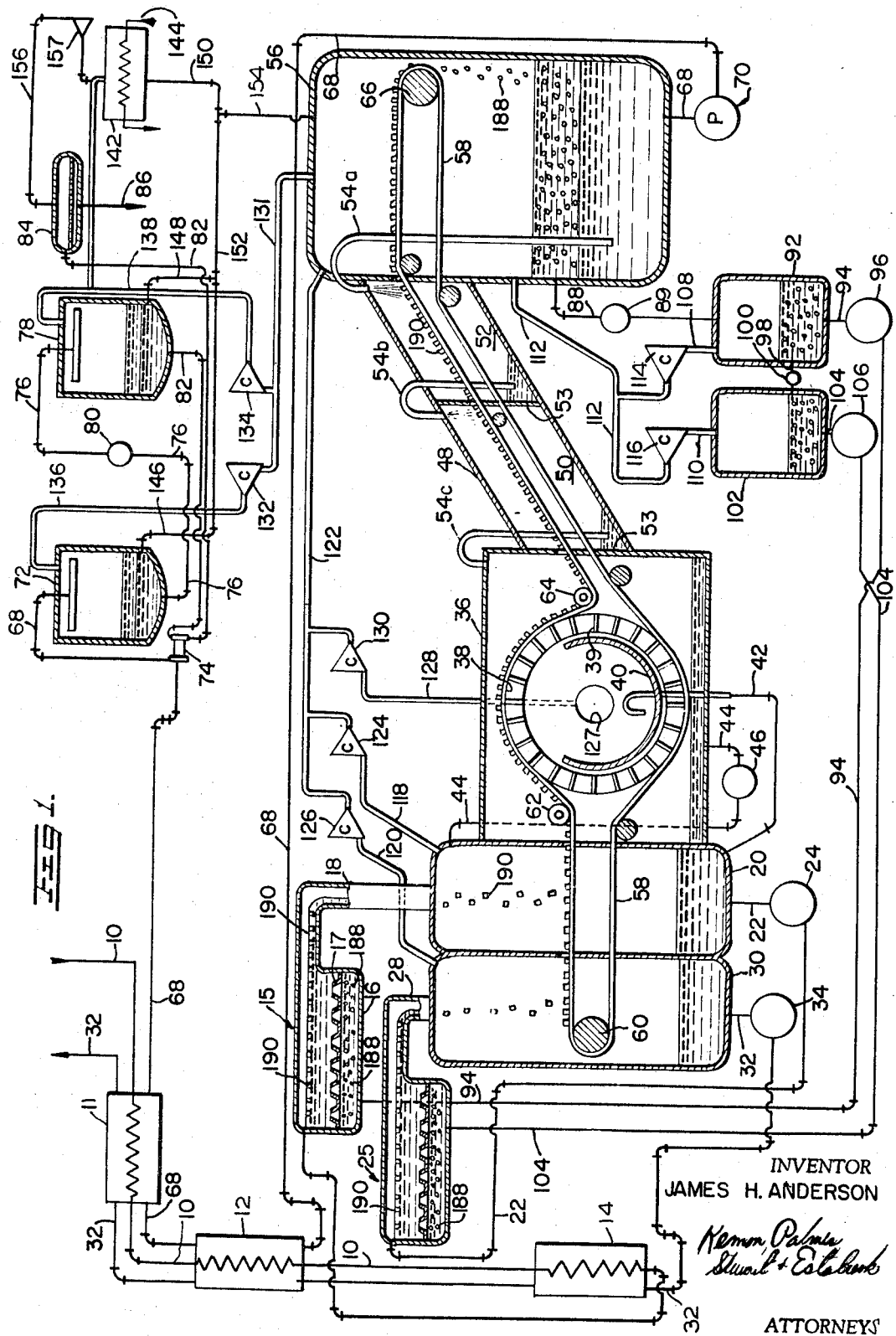

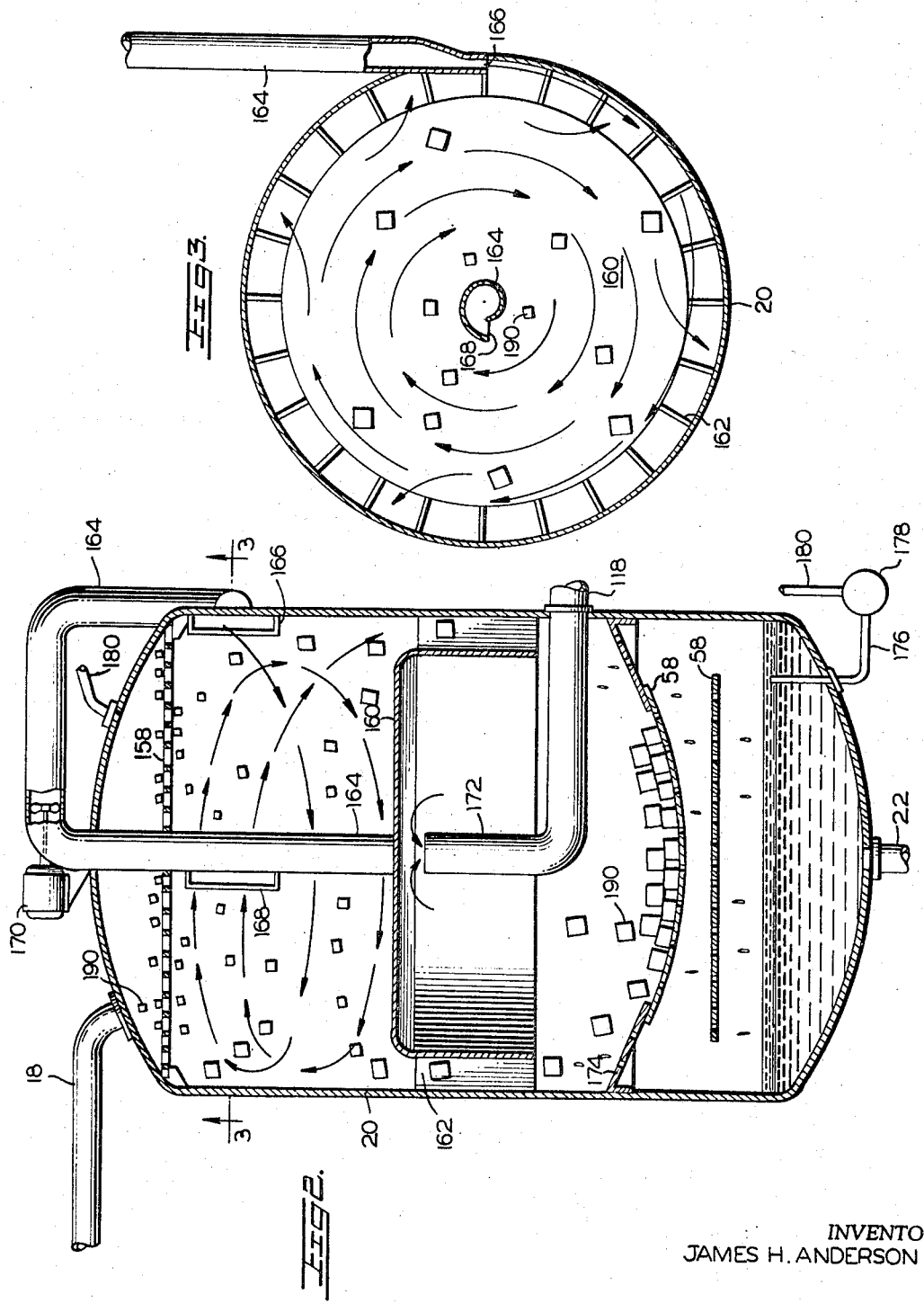

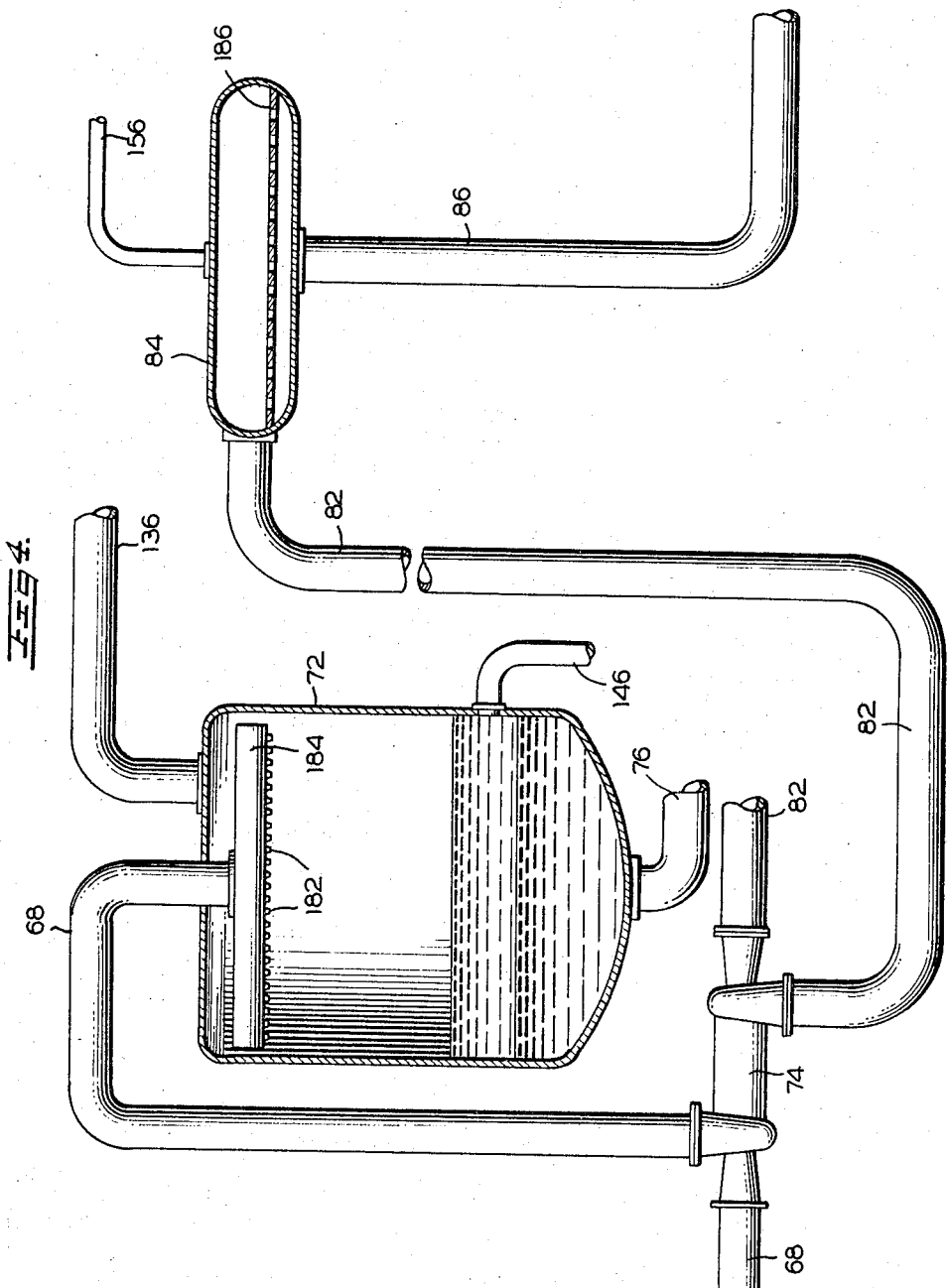

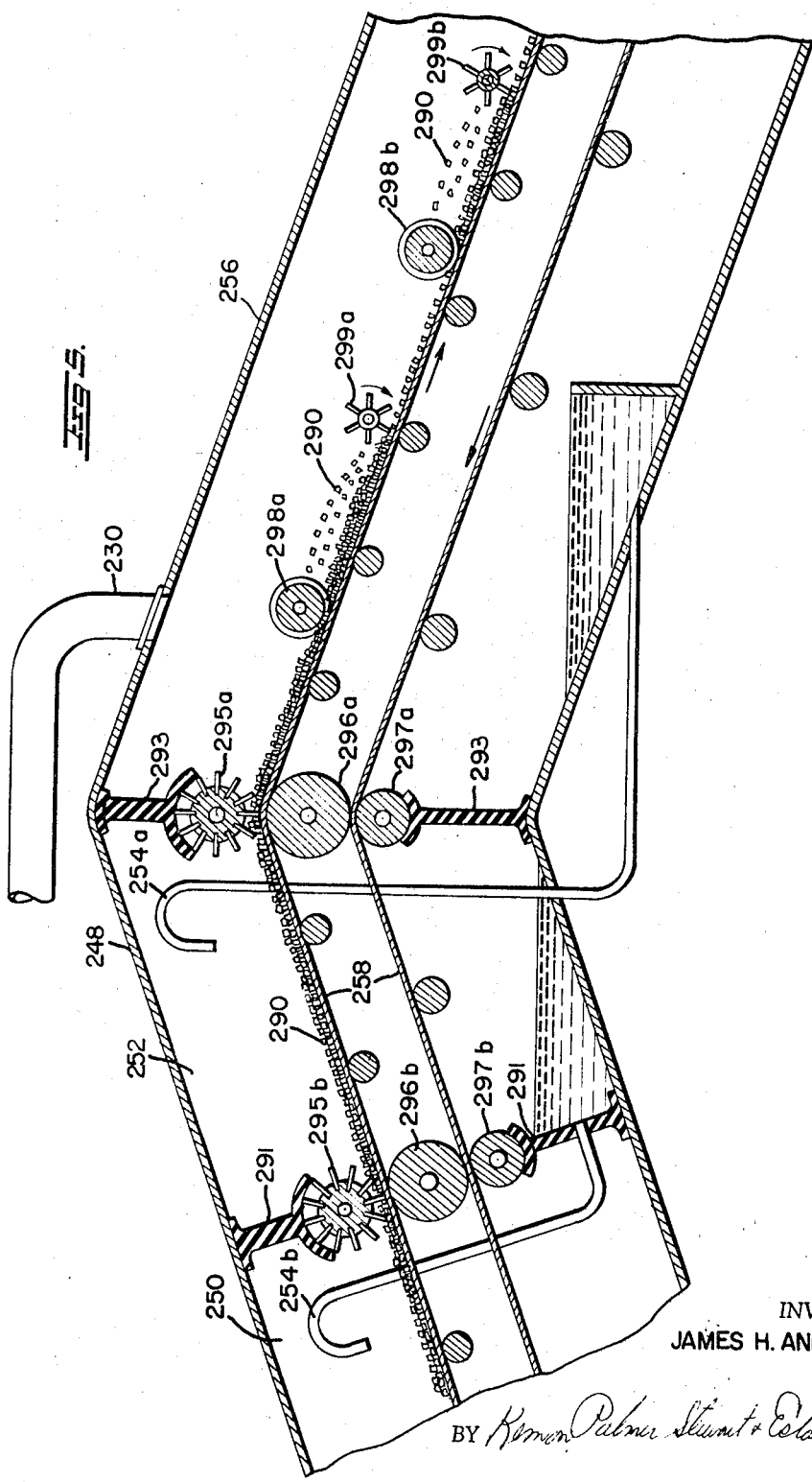

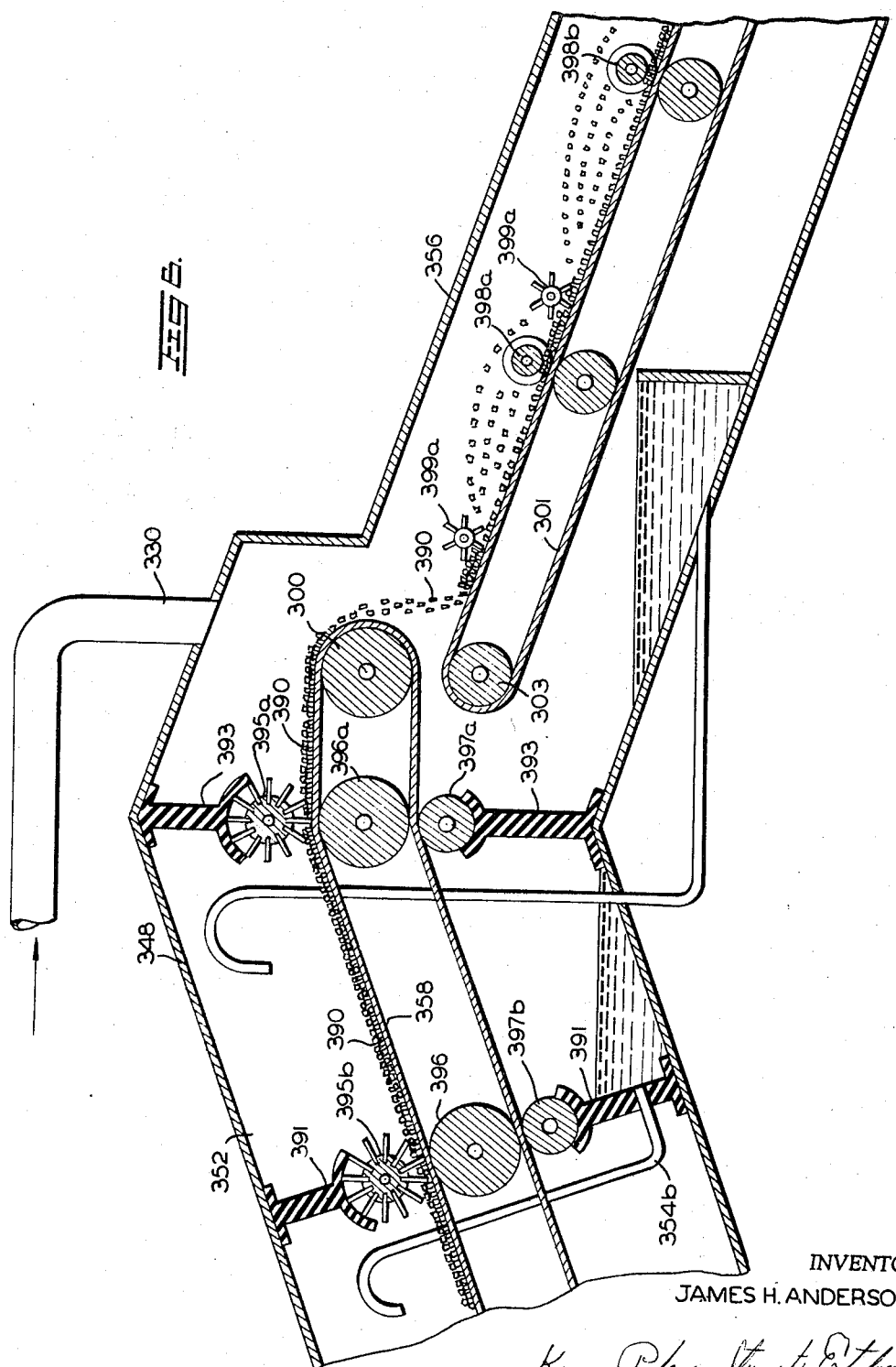

3,442,801
PROCESS AND APPARATUS FOR SEPARATING
WATER FROM AN AQUEOUS SOLUTION
James H. Anderson, 1615 Hillock Lane,
York, Pa. 17403
Filed Nov. 26, 1965, Ser. No. 509,949
Int. Cl. C02b 1/18, 3/06
U.S. Cl. 210—59                    17 Claims

ABSTRACT OF THE DISCLOSURE

An apparatus and process for separating water from aqueous solutions by extracting said water from said solutions through the crystallization of the water. The aqueous solution is introduced into a compartment where the water therein is crystallized, and the crystals are then dried and washed to effect the removal of any traces of the solution and then the crystals are melted to obtain water.

---

In recent years considerable sums of money have been expended in the development of techniques for extracting sweet water from brackish waters or from salt water available in the oceans and its tributaries. One of the current and most promising techniques is the process of freezing or hydrating saline water to produce pure water crystals. It has long been known that, as water is crystallized, the first crystals to form are pure water ice crystals and, if these crystals can be separated from the remaining brine, they may then be melted or liquefied to produce reasonably pure water. This process offers many advantages particularly in that the low temperature characteristics thereof reduce corrosion and scaling effects in the processing apparatus. Further improvements in the crystallization type of process embody the incorporation of direct heat transfer methods by using the latent heat of fusion of a water immiscible refrigerant, such as propane or butane, in direct contact with the water to form ice crystals. The absence of a heat transfer barrier tends to reduce the power requirements while offering one of the most economical processes currently available. Among the most difficult and expensive problems encountered in this type of process has been that of crystal formation, removal of the brine from the spaces formed between the crystals, removal of brine coating the crystals and melting or liquifying the crystals with sufficient rapidity to enable the process to be accomplished in as small a space as possible.

This invention relates to a crystallization type of process and specifically contemplates the use of a refrigerant or hydrator in direct contact with the processed solution.

It is an object of this invention to provide a simple, improved and economical process and apparatus for separation of sweet water from an aqueous solution such as brackish or sea water by crystallization of the water therein.

Another object is to provide an apparatus for continuously separating sweet water from an aqueous solution with a high degree of thermal efficiency and low power requirements by contacting the solution with evaporating refrigerant to initiate crystallization thereof, separating and building the crystalline structure from the mother liquor in a vortex driven by the refrigerant gas, drying th resultant crystalline structure with the refrigerant gas and melting or degenerating the crystalline structure with the liquid phase of the refrigerant.

Still another object is to provide an apparatus for producing sweet or fresh water which utilizes a moving porous belt disposed in tunnels to transport and process crystals formed during the process so that the crystals may be collected thereon, dried, washed and melted in one continuing operation.

A further object is to provide an improved apparatus for producing fresh water by direct refrigerant contact to accomplish crystallization which provides for inorganic pellets circulated with the refrigerant which serve as nuclei for the formation of the crystals while also neutralizing the refrigerant with means to dry and melt the crystals after crystallization of the water.

It is yet a further object of this invention to provide a process for producing fresh water from sea water which takes place within a small temperature range close to the natural temperature of the sea water and at pressures above atmospheric pressures thereby requiring a minimum amount of heat transfer surface to bring the sea water to the process temperature, minimum scaling or corrosion problems on heat transfer or other exposed surfaces, and minimum insulation problems.

A still further object is to provide a system for producing fresh water wherein power as opposed to heat, is used so that fuel per se is not required and thus, making the process ideally suited for areas where power is inexpensive.

These and other objects of the invention will become more apparent to those skilled in the art by reference to the following detailed description when viewed in the light of the accompanying drawings in which like reference numerals indicate like parts throughout the figures thereof and wherein:

FIGURE 1 is a schematic representation of an apparatus for separating pure water from an aqueous solution in accordance with the invention;

FIGURE 2 is a schematic representation of a vortex separator portion of the apparatus of FIGURE 1;

FIGURE 3 is a sectional view of FIGURE 2 taken along the lines 3—3;

FIGURE 4 is a schematic representation of another portion of the apparatus of FIGURE 1;

FIGURE 5 is an enlarged view of a variation of the washing and melting portion of an apparatus in accordance with the invention; and FIGURE 6 is an enlarged view of a further variation or modification of the washing and melting portion of an apparatus in accordance with the invention.

Although the process of crystallization is generally referred to in this specification as "freezing," by adjusting pressure and temeprature conditions in the various stages of the process, varying degrees of hydration can occur during the cycle. The conditions could be adjusted so that total hydration, as opposed to freezing, could occur. It should, therefore, be understood that although the terms "freezing" or "melting" may be used with relation to the crystallization of the water, hydration or decomposition of hydrate crystals is also contemplated as within the scope of the disclosed process.

Referring to FIGURE 1 of the drawings there is shown an inlet line 10 for conducting sea water through a series of heat exchangers 11, 12 and 14 respectively, into a first stage crystallization means 15. The means 15 comprises a closed tray 16 divided by a horizontally disposed perforate plate 17. The tray 16 communicates through a conduit 18 to a first stage separator means 20 that is provided with a sump that is in fluid communication with a second stage crystallization means 25 through a first stage brine or mother liquor conduit 22 and first stage brine pump 24. The second stage crystallization means 25 is divided by a perforate plate in a manner similar to that of the first stage crystallization means 15 and communicates, through a conduit 28 with a second stage separator means 30 disposed in abutting relationship to the first stage separator means 20. The second stage separator 30 is provided with a pump 34 for withdrawing brine from the sump of said separator and delivering it by conduit 32 to the heat exchangers 14, 12 and 11 respectively, for discharge from the system.

A drying means 36 is mounted in abutting relationship to the first stage separator means 20 and encloses a rotary, gas pervious drum 38 therein. A semicircular trough 40, fixed with respect to the drying chamber 36, is mounted inside the drum 38 and serves to block fluid flow through a portion of the drum and acts as a sump for fluid drained through the drum. A plurality of radially disposed vanes 39 mounted on the interior of the drum 38 are configured to sweep the outer periphery of the trough 40 so that the trough will block fluid flow through areas of the drum which are radially adjacent the circular portion of the trough. A drum brine return line 42 connects the sump area of the trough 40 to the sump of the first stage separator 20. The sump of the drying chamber 36 is connected to the upper end of the first stage separator 20 by a conduit 44 and a pump 46.

An upwardly inclined washing tunnel 48 is disposed in abutting relationship to the drying chamber 36 and is divided into subchambers 50 and 52 by vertical walls 53. U-shaped transfer tubes 54a, 54b and 54c are disposed at the lower end of each of the subchambers to provide communication with the next adjacent subchamber or chamber for purposes to be described below. A crystal melting vessel 56 is disposed in abutting relationship at the end of the washing tunnel 48.

A perforate endless belt conveyor 58, disposed through apertures suitably provided in each of the separator chamber walls, traverses each of the above-mentioned chambers and separators. The belt 58 is entrained about a series of rollers as follows: end roller 60 in the second stage separator means, rollers 62 and 64 and drum 38 in the drying means 36 and around a drive roller 66 in the melting chamber 56. Return rollers are disposed beneath the above-mentioned rollers as necessary to guide the belt during the return portion of its travel.

A fresh water take off line 68 and pump 70 communicate with the lower portion of the sump of the melting vessel 56 and transmit the contents thereof through heat exchangers 12 and 11 to a pump-turbine 74. Water is directed therefrom through a first stage condenser 72 and, through an outflow conduit 76, to a second stage condenser 78 by means of a rotary pump 80. An outflow line 82 transmits water from the second stage condenser 78, through the turbine portion of the rotary pump-turbine 74, to a degasser or stripper 84. Fresh water is removed from the degasser 84 by way of a fresh water outlet line 86.

The melting vessel 56 has a liquid refrigerant outlet line 88 that provides communication between an intermediate portion of the melting chamber and a first stage refrigerant cooler 92, flow being controlled therethrough by a valve 89. The sump of the refrigerant cooler 92 is in communication with the first stage crystallization tray 16 through a conduit 94 and pump 96. A transfer conduit 98 and a valve 100 afford communication between the first stage refrigerant cooler 92 and a second stage refrigerant cooler 102. Communication between the sump of the second stage refrigerant cooler and the second stage crystallization tray is provided by a conduit 104 and a pump 106. Refrigerant gas outflow conduits 108 and 110 provide communication between the coolers 92 and 102 and a gas return manifold 112 through first and second stage cooler gas compressors 114 and 116, respectively. The manifold 112 communicates with the interior of the melting vessel 56 above the level of the liquid therein.

Returning to the first and second stage separator chambers 20 and 30, refrigerant gas is withdrawn from these components by conduits 118 and 120, the conduits communicating with a return manifold 122 through compressors 124 and 126 respectively, which manifold in turn communicates with the interior of the melting vessel 56.

Gas is removed from the drying enclosure 36 through an exhaust conduit 128 which communicates with the interior of the drum 38 through the intake 127 and manifold 122 through a compressor 130.

Excess uncondensed refrigerant vapor is withdrawn from the melting vessel 56 through a gas conduit 131 and is divided into parallel circuits and transmitted through the compressors 132 and 134 to the first and second stage condensors 72 and 78 by conduits 136 and 138. A portion of the gas from the conduit 138 is diverted through branch conduit 140 to a sea water heat exchanger 142. In this exchanger, raw sea water is placed in heat exchange relationship with gas through sea water conduit 144.

The condensed refrigerant is removed from the condensers 72 and 78 and the heat exchanger 142 through conduits 146, 148 and 150 respectively, each of these conduits communicating with a manifold 152 which is in communication with the upper portion of the melting vessel 56 through conduit 154. A gas conduit 156 also transmits the refrigerant gas vapors in the stripper 84 to the sea water heat exchanger 142 through a stripping compressor 157.

Turning now to FIGURES 2 and 3 of the drawings, the first stage separator 20 is shown in enlarged detail. The second stage separator means 30 is substantially identical in structure to the first stage separator means and the following detailed description will therefore apply to the corresponding components of both. The separator means comprises a cylindrical chamber, the brine-crystal input conduit 18 communicating with the upper end thereof. A perforate crystal distributing surface 158, disposed across the upper end of the tank, serves to distribute the outflow from the conduit 18 over the total area of the separator chamber prior to entrance of the inflowing mixture into the separating zone. The separating zone is defined by the distributing surface 158 at the upper end and a base plate 160 at the lower end thereof. The base plate 160 has a depending portion disposed around the periphery thereof to form an inverted cup, and is supported concentrically in the separator chamber by a series of vanes 162 disposed between the chamber walls and the depending portion thereof. A vapor circulating duct 164 extends from the base plate 160 through the surface 158, the top of the separator chamber and from there, extends radially to communicate with a nozzle 166 tangentially disposed on the wall of the separator 20. The duct 164 has a vapor intake opening 168 tangentially disposed thereon in a direction opposite to that of the nozzle 166 and contains a motor driven blower or fan 170 in the upper portion thereof to circulate vapor from the intake opening 168 to the nozzle 166. The disposition and configuration of the nozzle 166, intake opening 168 and duct 164 is so arranged that, with proper selection of the size of the blower 170, a vortex is established in the separation zone as indicated by the arrows in FIGURES 2 and 3. A vapor exhaust intake 172 is centrally disposed beneath the base plate 160 and is in communication with the conduit 118 for transmission of vapors to the compressor 124 (FIGURE 1). The lower portion of the separator 20 is traversed by the endless belt 58 which receives and transports material dropping from the separation zone thereon. A portion of this material is directed onto the belt by deflectors 174 mounted on either side of the uppermost portion of the belt. A scavenger system comprising an inlet line 176, pump 178 and return line 180 is provided at the base of the separator 20 and serves to remove surface fluid and solids from the sump area thereof for return to the upper portion of the separator.

FIGURE 4 is an enlarged view of the refrigerant condenser and gas stripper portion of the apparatus shown in FIGURE 1. Although FIGURE 4 represents the first stage condenser 72, the condenser structure shown therein is substantially identical to that of the second stage condenser 78 and therefore the parts specifically described below are to be considered descriptive of both. The condenser shown in this embodiment of the invention is of the gas-liquid contact type and accomplishes the condensation of refrigerant gas by spraying water pumped from the fresh water take off line 68 by the pump-turbine 74, through spray nozzles 182 disposed along a distributing header 184. The pump turbine may be augmented by a drive motor (not shown) to make up for friction losses in the outflowing water if this is found necessary. Refrigerant vapor is injected into the condenser through the gas inlet conduit 136 which communicates with the interior of the condenser 72 through the top wall thereof. After heat exchange between the components, the condensed refrigerant and water stratifies in the sump of the condenser according to their relative densities. The stratified components are then removed through conduits 76 and 146 disposed at appropriate levels in the lower portion of the condenser. Water removed from the condenser flows through conduit 76 through the second stage condenser, is returned to the turbine of the pump-turbine 74 and from there is transmitted to the stripper 84 for degassing thereof. The stripper comprises a chamber which is horizontally divided by a perforate plate 186 which serves as a distributor for fluid entering the device. In the stripper 84, the vapor is stripped from the fluid therein and exhausted through conduit 156. The liquid is drained from the stripper through conduit 86.

Referring now to FIGURE 5 of the drawings, a variation of the portion of the apparatus accomplishing the washing and melting phase of the process is shown in enlarged detail. In this figure, portions thereof relating to corresponding portions of the preceding figures are indicated by the same numeral only of the 200 order. In this figure a washing tunnel 248, inclined upwardly in a fashion similar to that of washing tunnel 48 of FIGURE 1, is divided into subchambers 250 and 252 by vertical walls 291 and 293. A belt 258 traverses the subchambers 250 and 252 and passes through the walls 291 and 293 by means of rollers 295a, 295b, 296a, 296b, 297a, and 297b, which in addition to providing a fluid seal between the subchambers, provide support for the belt 258. The vaned rollers 295a and 295b cut through the crystal bed to the surface of the belt to maintain the fluid seal at that point.

The melting vessel 256 in the version of FIGURE 5 is in the form of a downwardly sloping tunnel of a length sufficient to provide a proper melting time for the crystals 290. Additional crystal bed agitating rollers 298a and 298b provided with transverse peripheral serrations or fins are disposed in the melting vessel 256 in contact with the belt 258 to maintain the crystal bed of a loose configuration. Paddle rollers 299a and 299b are disposed in the melting vessel 256 downstream of each of the rollers 298a and 298b and rotate in the opposite direction of the aforedescribed rollers to pick up the surface portion of the crystal bed and to throw them into the melting fluid stream to thereby provide increased heat transfer surface to increase the rate of melting of the crystals.

The washing and melting apparatus shown in FIGURE 6 is similar in many respects to the variations and modifications shown in FIGURE 5, and the parts in FIGURE 6 which correspond to like parts in FIGURE 5 have been indicated by the same reference numerals only of the next series higher. The upper run of the conveyor belt 358 moves between the rollers 395a and 396a and is entrained about roller 300 with the lower run of said belt moving back between rollers 396a and 397a. The melting portion or section 356 of the tunnel structure is provided with a separate conveyor 301 that is mounted within the tunnel in a plane beneath the roller 300. The conveyor 301 at its innermost end is entrained about a roller 303 that is positioned beneath the roller 300 so that the crystalline bed of crystals 390 carried by the upper run of the conveyor 358 will be discharged from this conveyor as said conveyor moves over the roller 300 and directed onto the upper run of the conveyor or belt 301. The upper run of the conveyor 301 has associated therewith agitating rollers 398a and 398b, which conform to like rollers as shown in FIGURE 6 as rotating in a direction opposite to that shown by the corresponding rollers in FIGURE 5. The paddle rollers 399a and 399b could be rotated in the same direction as the corresponding rollers shown in FIGURE 5 as either direction of rotation can be adopted for the purpose of picking up the crystals and throwing them up into the gas stream to aid and abet the melting thereof. The use of paddle rollers in collecting and throwing the crystals up into the gas stream for the melting thereof permits the use of considerably less conveyor belt area and this pertains not only to the width but also to the length while still obtaining a satisfactory melting action with regard to the crystals. This arrangemenet readily results in the use of a smaller tunnel and a narrower conveyor belt and one of a shorter length than would be the case if the paddle rollers were not employed in the manner and for the purpose as described hereinabove.

Through the use of two conveyor belts, the belt 358 can be of a very porous type, which would permit the rinse water and the like to drain therethrough and the conveyor belt 301 can be formed on a nonporous material. In addition, by terminating the conveyor belt 358 in the manner as disclosed in FIGURE 6 further tends to prevent the carrying of brine or the like to the melting section of the tunnel and thus tends to retain any brine solution in the washing portion of the tunnel.

Utilizing the various temperature and pressure parameters set forth below, the system operates as follows:

THE RAW WATER CIRCUIT

Although an apparatus for sweetening sea water is specifically described herein, it should be understood that the invention is applicable to the separation of water from any aqueous solution such as brackish water, water with organic salts or water having dissolved organic matter therein. In the specifically described apparatus, sea water is taken in through inlet line 10 and passes through the heat exchangers 11, 12 and 14, respectively, which cool the incoming salt water with countercurrent streams of fresh water and concentrated salt brine passing in heat exchange relationship through fresh water take off line 68 which is at a temperature of approximately 33° F. when entering heat exchanger 12, and the second stage brine conduit 32, which enters heat exchanger 14 at a temperature of approximately 26° F. and enters heat exchanger 12 at approximately 32° F. since it is desirable to cool the incoming sea water to approximately 35° F. The incoming sea water enters the first stage crystallization means 15 at about 35° F. and is contacted therein with a mixture of propane and nucleating pellets 188. The pellets 188 comprise small spheres of beads, preferably made of glass, plastic or other inert material graded to a mean density approximately the same as that of the liquid refrigerant or about 33 lbs. per cubic foot in the case of propane. To achieve this density, the pellets should be made either hollow or fabricated from a very lightweight material. The pellets should also preferably be less than one millimeter in diameter to provide ease of handling and circulation. The most satisfactory diameter, composition and configuration of these pellets, however, will be best determined by actual experimentation. By using pellets of the same approximate density as that of the liquid refrigerant, they may be mixed uniformly in the liquid so that the resulting mixture can be transmitted through the various system conduits and separated from other liquids in the system as a permanent mixture. With the use of propane and pellets equal to the density of propane, the pellets will float on water and thereby not be easily mixed therewith.

The refrigerant-pellet mixture enters the first stage crystallization means 15 at a temperature of approximately 28° F. as a result of cooling accomplished elsewhere in the apparatus as will be described in greater detail below. The mixture rises through the perforate plate 17 and upon contact with the warmer incoming sea water, the propane evaporates thereby further contributing to the cooling of the incoming water. Since the pellets are precooled below the freezing temperature of water, ice immediately starts to form on the surface of the pellets thereby initiating the formation of ice crystals. The crystals 190 are distinguished from the pellets 188 in the drawings by their rectangular formation. The crystals 190 rise to the surface of the fluid in the crystallization means 15 and the slurry formed thereby overflows into the first stage separator means 20 through the conduits 18.

Turning momentarily to FIGURES 2 and 3 of the drawings, the slurry formed by the crystals 190 and the mother liquor enter the upper end of the first stage separator 20 and are spread out over the distributing surface 158. The mixture then drops into the separating zone whereupon it is entrained by the vortex created by the circulating gas as described above. The crystals, refrigerant and water vapor continually mix in the vortex, causing the crystals to continue to grow in size until they are large enough that, through centrifugal force, they are thrown to the outside periphery of the separator. The smaller ice particles will remain in the vortex of the separating zone as long as the frictional forces of the gas are great enough to drag them along with the stream or the centrifugal force is not great enough to throw them out to the wall of the separator. As they circulate, they strike other particles of liquid and ice and gradually grow into larger particles until they are large enough to be separated by centrifugal force. When the crystals have grown to a sufficient degree, they can no longer be sustained by the vortex and drop through the vanes 162 onto the porous belt 58 while residual mother liquor passes through the belt and collects in a sump in the lower portion of the separator 20. This process is similar to the conglomeration and growth of ice particles that occurs in the formation of hail stones in nature. Some of the finer ice particles will inevitably be taken into the vapor intake 168 and passed through the circulating duct 164 and out of the nozzle 166 to continue the process of conglomeration. It may be necessary, for this reason, to either coat the circulating duct 164 with a smooth, nonsticking material such for example as rubber or plastic or apply a small amount of heat to the duct to prevent ice build up therein.

The vanes 162 are set at an angle sufficient to produce a slight spinning flow of particles traveling therethrough but below an angle which would perpetuate or maintain the high rotary velocity from the vortex above. The flow velocity through the vane area, however, must be great enough to keep the ice and liquid flowing along the outer wall of the separator 20 while the propane vapor flows toward the center of the chamber under the base member 160. The propane vapor is exhausted from the separator through the vapor exhaust line 172 and, as in the case of the duct 164, this line may also require warming to prevent ice build up caused by small water particles carried along with the propane stream.

Under perfect operational conditions, it might be assumed that all of the refrigerant is evaporated in the vortex and mixing spaces of the separator 20. In actual practice, however, this will probably not be the case and some liquid propane, ice particles, and pellets will, in all probability, leak through or around the belt and fall into the separator sump. To recover this residue, the scavenging recirculating pump 178 recovers a small quantity of the fluid near the surface of the sump fluid and through conduit 180, returns it to the top of the separator for reprocessing.

THE BRINE CIRCUIT

The brine in the mother liquor collected in the sump of the first stage separator means 20 has been concentrated to a certain degree by the removal of water in the form of crystals therefrom. If the initial salinity of the incoming water or the total recovery of water from the saline water desired, so dictates, the mother liquor from the first stage separator can be passed through additional crystallization processes. In the embodiment of FIGURE 1, the mother liquor from the sump of the first stage separator means 20 is passed through a second stage crystallization separating process. The mother liquor is removed from the sump through the conduit 22, and is pumped by the pump 24 into the second stage crystallization means 25 wherein it is mixed with a mixture of liquid refrigerant and pellets 188. The resulting crystals 190 and brine are passed into the second stage separator means 30 for processing in a manner identical to that described above for the first stage separator 20. The resulting crystals 190 are deposited on the belt 58 upstream of those from the first stage separator means 20 and the remaining mother liquor containing highly concentrated brine is collected in the sump of the separator means 30. This mother liquor is then removed from the system through the conduit 32 and pump 34 which pumps the fluid through the heat exchangers 14, 12 and 11 to provide cooling of the incoming sea water as has been described above.

THE CRYSTAL CIRCUIT

From the separator means 20 and 30, the ice crystals 190 and the refrigerant vapor pass into the drying means 36 and as the belt 58 traverses the porous drum 38, the gas is withdrawn from the chamber through the intake 127 and the exhaust conduit 128 by the compressor 130. This arrangement serves to pass the withdrawing gas through the porous belt and the bed of ice crystals deposited thereon thereby creating a pressure drop through a bed of ice crystals of sufficient magnitude to remove adhered brine from between the crystals. This step is very important since the volume of brine trapped between ice crystals can be almost as great as the brine adhered to the particles themselves and removing most of the interstitial brine with a drying stream of gas, the subsequent crystal washing requirement is substantially reduced and overall process efficiency is improved. The brine swept from the ice bed is collected in the trough 40 from where it is pumped to the sump of the separator means 20 through the drum brine return line 42. Since the trough 40 is in a lower pressure environment than the pressure in the separator means 20, it will be necessary to either have the drum level higher than the brine level in the separation means, as shown in the drawings, or incorporate a pump, not shown, to transmit the brine. It will be necessary to provide some form of separator in the inner drum to separate the liquid brine from the vapor before the vapor is exhausted to the compressor 130, however, since there are many means known in the art for separating the gas from the liquid at this point, such a separator is not specifically illustrated in the drawings nor described herein.

In addition to providing a guide for the belt 58, the rollers 62 and 64 may be provided with teeth to help break up the ice bed and keep the crystals in a reasonably loose condition. From the drying enclosure, the ice crystals are then moved on the belt 58 into the washing tunnel 48. Fresh water, taken from the melting vessel 56 through a transfer tube 54a, is pumped by a pressure differential between chambers, and sprayed onto the traveling ice bed in the subchamber 52. Rinse water collecting in the bottom of the subchamber 52 is transmitted through the transfer tube 54b and sprayed onto the ice bed in the preceding subchamber 50. Rinse water in subchamber 50 is similarly collected and transmitted through the transfer tube 54c onto the ice bed as it is moving toward the end of the drying enclosure 36. The residual rinse water is collected in the sump of the drying enclosure 36 and transmitted to the top of the first stage separator through the conduit 44 and pump 46 for re-recovery of the water remaining in the residual rinse water. As will be described in greater detail below, the pressure in the melting vessel 56 will be relatively high as compared to that in the drying enclosure 36. To minimize sealing problems between these pressure zones, the subchambers therebetween should be designed so as to be at graduated incremental pressures in order that the pressure differential between adjacent chambers and/or subchambers is relatively low. The pressure differential between the melting vessel 56 and the subchamber 52, the pressure differential between the subchamber 52 and the subchamber 50 and the pressure differential between the subchamber 50 and the drying enclosure 36 will be sufficient, in combination with gravity flow, to provide flow of the rinse water through the transfer tubes 54a, 54b and 54c. In the alternative, a series of pumps, not shown, could be provided in the transfer tubes to accomplish the transfer of rinse water therethrough.

The above-described rinsing apparatus furnishes counterflow rinsing so, as the rinse water successively passed through the ice bed in the counterflow direction, it dissolves and washes off the salt which adheres to the crystals. The concentration of salt in the final rinse water will be nearly up to that of the original sea water. By sloping the tunnel upwardly, as shown, a natural countercurrent flow of washing water is established thereby minimizing the amount of fresh water required for washing salt water from the crystals and utilizing such water with a maximum efficiency.

The crystal bed is next carried into the melting vessel 56 wherein the pressure and temperature approximate the saturation condition for the refrigerant vapor. If propane is used as a refrigerant, this pressure would be 69.9 p.s.i.a. at a temperaure of 33° F. This environment condenses a major portion of the refrigerant vapor causing it to give up its heat of condensation for use in melting the crystals therein. As the crystals melt, the water and liquid refrigerant drain from the belt into the sump of the melting vessel 56. The porosity of the belt allows the water to drain from the crystal bed so that the remaining crystals present a maximum surface area of contact with the liquefied refrigerant. Since melting will require a certain amount of time, it is probable that the melting process must be accomplished over an appreciable length of belt. As shown in the variation of FIGURE 5, the melting zone may consist of a downsloping tunnel in abutment with the washing tunnel. The pellets 188 drop off the end of the belt into the vessel for reprocessing through the system. At this point, it may be advisable to have a spray of fresh water, not shown, directed on the belt to insure that the remaining pellets are washed therefrom so that they will not cling to the belt on the return run thereof.

Due to the respective densities, the refrigerant and pellets will float in a stratified condition on the fresh water in the sump of the melting vessel 56 and are removed through the liquid refrigerant outlet line 88.

THE FRESH WATER CIRCUIT

Fresh water is removed from the melting vessel 56 through the fresh water take off line 68 and pump 70 and then directed through the inlet heat exchangers 14 and 12 to provide cooling for the incoming sea water as described above. The inlet exchangers are so designed that the fresh water absorbs heat from the incoming sea water to such a degree that it leaves the heat exchangers at approximately 60° F. The fresh water is then transmitted to the refrigerant condensers 72 and 78 where it absorbs heat from the propane being condensed therein to such a degree that its outlet temperature is raised to approximately 80° F.

Since the incoming sea water has oxygen, nitrogen and other gases dissolved in it as it comes into the apparatus as well as residual refrigerant gas picked up during the process, these gases must be purged from the final pure water in the system. Some of these gases will come out in the condensers 72 and 78 and means should be provided to purge these gases therefrom. Since condenser purging apparatus is conventional in the refrigeration art, the means for purging such gases from the condensers is not shown nor described. The fresh water is transmitted from the second stage condenser 78 to the stripper or degasser 84 where at its outlet temperature (80° F.) the remaining refrigerant gas is released from the fresh water by and transmitted through the stripping compressor 157 to the sea water heat exchanger 142. Fresh water is then taken out of the system through the fresh water outlet line 86.

THE REFRIGERANT CIRCUIT

Although many refrigerants such, for example, as propylene, cyclopropylene, butane, butene and other hydrocarbons are suitable for use in this process, propane has been specified for the purpose of description. Propane is particularly suitable for use as a refrigerant or hydrating agent in this process and apparatus because it has a relatively high vapor pressure and density at water freezing temperatures which permits the use of smaller compressors for a given refrigerant capacity than for other suitable gases. The high vapor pressure also permits easy removal of traces of the gas from the resulting fresh water product, because propane is almost insoluble in and is not chemically reactive with water it can be evaporated in direct contact with the water and can be condensed in direct contact with the water or hydrate crystals without contamination thereof thereby eliminating the need for an intermediate heat transfer surface between the water and the refrigerant. The high density and operating temperature of propane vapor furthermore permits its use as a very effective agent for sweeping away salt or brine that adheres to and between adjacent crystals of ice during the process. Another benefit afforded by the use of propane is that it is much less dense than water and it is, therefore, easy to separate the liquid propane from water at the appropriate points in the cycle.

In the embodiment as described, a mixture of liquid propane and pellets 188 is removed from the melting vessel 56 through the liquid refrigerant outlet line 88 and, through valve 89 from where it is transmitted to the first stage refrigerant cooler 92. The mixture is expanded to a pressure in the first stage cooler equivalent to a temperature of 28° F. and from there a portion of the mixture is transmitted to the first stage crystallizer 15. A portion of the refrigerant evaporates in the first stage cooler 92 and is recompressed in the first stage cooler compressor 114 and returned to the melting chamber 56 through the manifold 112. The remaining portion of the propane-pellet mixture is transmitted to the second stage cooler and expanded to a pressure equivalent to a temperature of 26° F. from whence it is pumped to the second stage crystallizer 25 through the conduit 104 and the pump 106. The portion of the refrigerant evaporating in the second stage cooler is recompressed in second stage cooler compressor 116 and returned to the melting chamber 56 through the manifold 112.

The propane expands to a pressure of approximately 65 p.s.i.a. and evaporates in the first and second stage crystallizers 15 and 25. It then flows as a vapor or as the evaporant produce of the expanding refrigerant into the first and second stage separators 20 and 30 from where a portion thereof is withdrawn from each of the separators through conduits 118 and 120 and compressed in compressors 124 and 126 to a pressure of about 69.5 p.s.i.a. and a temperature of 33° F. for return to the melting chamber 56 through the manifold 122. The remaining evaporant produce is exhausted from the drying chamber 36 by way of the intake 127 and the conduit 128, compressed in the compressor 130 to a pressure of about 69.5 p.s.i.a. at a temperature of 33° F. and returned to the melting vessel 56 again through the manifold 122.

The conditions produced by the above-mentioned compressors provide for reliquefication of the evaporant product in the melting chamber, the heat of condensation thereof providing melting of the ice crystals therein as has been described above.

THE EXCESS SYSTEM HEAT

Since, in the cycle as thus far described, the sea water input is at 30° F. and both the brine and fresh water are expelled at the inlet heat exchangers at 60° F., some heat must be rejected from the system elsewhere to provide proper heat balance. Furthermore, since the power put in the system to the compressors, pumps, belt drives and other power input apparatus will show up as increases of heat input to the system, provision must also be made to reject this heat from the system. The excess heat from the above sources actually manifests itself as an excess of uncondensable gas in the melting vessel. The excess heat is accommodated by the apparatus of this invention by removing portions of the vapor in the melting chamber 56 for condensation in the propane condensers 72, 78 and the exchanger 142. The condensers 72 and 78 are placed in series in the water circuit and in parallel in the refrigerant circuit and condensation of the vapor is accomplished by compressing the vapor extracted from the melting vessel 56 in the compressors 132 and 134 and cooling the vapor by placing it in direct transfer contact with the outgoing purified water. The compressor 132 compresses the portion of the propane vapor directed thereto to pressure equivalent to 75° F. and the compressor 134 compresses the propane vapor flowing therethrough to a pressure equivalent to 85° F. The refrigerant from the condensers after condensation thereof, as has been described above, is transmitted therefrom through conduits 146 and 148 and returned to the melting vessel 56 through conduit 154.

The exchanger 142 receives a portion of the propane vapor from the compressor 134 by way of conduit 140 and condenses the vapor placing it in heat exchange contact with sea water taken in through conduit 144 at 70° F. This condenser utilizes the ambient sea water to absorb the heat input from all the power driven equipment of the system plus the heat leaks from the atmosphere to the system to aid in achieving a heat balance for the entire system. Since the system as described achieves an exhaust to fresh water at 80° F. and brine at 60° F., this comes close to balancing the total heat input from the incoming sea water to be processed at 70° F.

This invention then provides an apparatus for separating water from aqueous solutions in which a continuous belt is employed to transport material through the entire process of crystallization, drying, washing and liquefying. The apparatus is particularly suitable for multiple staging in the crystallization, separating, drying, washing and melting means as may be required for the initial characteristics of the solution to be processed, the degree of purity required in the processed water or the amount of water to be removed from the solution. The refrigerant is used not only to provide for the initial formation of crystals but is used in a vortex to furnish crystal growth, as a drying vehicle to dry and remove brine and included salt from the crystals and as a melting vehicle to apply heat of condensation to melt or liquefy the crystals. The invention furthermore provides a novel means in the form of pellets which serve as nuclei to initiate ice crystallization, which pellets may be precooled to accelerate formation of the crystals and may be circulated and recovered with the refrigerant as an indigenous component thereof.

I claim:

1. An apparatus for separating water from an aqueous solution comprising a compartment for receiving said solution, means in said compartment for crystallizing the water in said solution to obtain a slurry of crystals and mother liquir, separator means connected to said compartment to receive said slurry and mother liquor, drying means and washing means, a conveyor positioned in said separator means to receive the crystals separated from said slurry and mother liquor, said conveyor extending through said drying means, means for removing the residual mother liquor trapped between said crystals as said conveyor moves through said drying means, said conveyor extending through said washing means for applying sweet water to said crystals to remove residual mother liquor adhering to the surface thereof, said conveyor terminating in a chamber having means to apply heat to said crystals for melting same to obtain water which is collected in said chamber.

2. An apparatus for separating water from an aqueous solution as set forth in claim 1 wherein said compartment is in communication with an aqueous solution inlet and cooling means, and said separator means embodies a growth inducing zone and compressor means having inlets connected to said separator means and said drying means and communicating with said crystal melting means for delivering a gaseous medium to said melting means for raising the temperature therein for melting the crystals on said conveyor.

3. An apparatus for separating water from an aqueous solution as set forth in claim 1 wherein said separator means has an outlet and said melting chamber has an inlet disposed above the outlet of said separating means, said drying means and washing means being interposed between said separating means and melting chamber for connecting the outlet of said separating means to the inlet of said melting chamber.

4. An apparatus for separating water from an aqueous solution comprising a crystallization tray, means for feeding said aqueous solution through said tray, means for feeding a mixture of evaporating water immiscible organic fluid and nucleating pellets of less density than said aqueous solution into said tray at a temperature less than the freezing point of water to initiate crystallization of the water in said solution about said pellets, a separator and growth inducer to receive from said tray a slurry of crystals and mother liquor, a conveyor in said separator for receiving crystals from said slurry and mother liquor, a drying enclosure and a washing means, said conveyor extending through said drying enclosure for removing the residual mother liquor trapped between said crystals, said conveyor extending through said washing means for rinsing said crystals to remove residual mother liquor adhering to the surface thereof, said conveyor terminating in a chamber having means to apply heat to said crystals for melting same to obtain water which is collected in said chamber.

5. An apparatus for separating water from an aqueous solution as set forth in claim 4 wherein said separator has means therein to generate a gas vortex from the evaporant product gas phase of said fluid, said vortex entraining said slurry to conglomerate and induce growth in said crystals until the weight of the resultant crystals increases to a point where said crystals cannot be sustained by said vortex, said drying enclosure having means therein to withdraw therefrom the residual mother liquor trapped between said crystals on said conveyor, and said washing means directing a rinsing water over said crystals on the conveyor to remove residual mother liquor adhering to the surface of said crystals.

6. An apparatus for separating water from an aqueous solution as set forth in claim 4 wherein sealing means are interposed between said washing and melting means, and agitating means engaging the crystals on the conveyor in said melting means to aid in melting the crystals to obtain water therefrom.

7. An apparatus for separating water from an aqueous solution comprising in series at least one crystallization tray, a crystal separator and growth inducer, a crystal drying enclosure, a crystal washing tunnel, and a crystal melting vessel;

porous conveyor means disposed to traverse the interior of said separator, drying enclosure, washing tunnel and melting vessel;

means for feeding an aqueous solution through said crystallization tray, and means for feeding a mixture of evaporating water immiscible organic fluid and nucleating pellets of less density than said aqueous solution into said crystallization tray at a temperature less than the freezing point of water to initiate crystallization of the water in said solution about said pellets, and means to transmit a slurry of crystals and mother liquor from said crystallization tray into said separator;

means in said separator and growth inducer to generate a gas vortex from the evaporant product gas phase of said fluid, said vortex entraining said slurry to conglomerate and induce growth in said crystals until the weight of the resultant crystals increases to a point where said crystals cannot be sustained by said vortex and same are deposited on a crystalline bed upon said conveyor means;

means in said drying enclosure to withdraw therefrom the evaporant product gas phase of said fluid through said crystalline bed for drying same;

means in said washing tunnel to rinse said crystalline bed with a counter flow of sweet water;

and means to receive and compress the evaporant product gas phase of said fluid from said separator and drying enclosure for liquefying same prior to delivery thereof to said melting vessel for contact with said crystalline bed to impart the heat of condensation thereto for melting same, said melting vessel receiving and stratifying the sweet water melted crystalline product and the mixture of said fluid and said pellets, means to withdraw the sweet water, and means to withdraw and cool the fluid-pellet mixture for recirculation to said crystallization tray.

8. An apparatus for separating waater from an aqueous solution including an aqueous intake and cooling means embodying an inlet line associated with a plurality of heat exchangers, an aqueous solution crystallization means communicative with said intake and cooling means and comprising at least one closed crystallization tray having therein a horizontally disposed perforate dividing plate, said tray communicative with said inlet line at a point above said plate, means to supply a mixture including a liquid refrigerant and a plurality of pellets of lighter density than said aqueous solution to said tray at a temperature below the freezing point of water so that crystallization of the water in said solution is initiated on said pellets to form a fluid-crystal slurry on the surface of the fluid in said tray upon contact of said pellets with said aqueous solution, the pressure in said tray being such that the refrigerant supplied thereto evaporates to provide further cooling for the fluid therein, said fluid-crystal mixture overflowing from said tray for transmission to a crystal separator and growth inducing means;

said crystal separator and growth inducing means comprising a chamber having adjacent the top thereof a horizontal perforate distribution surface, a horizontal plate disposed across the midportion of said chamber and configured to form an annular space between the periphery thereof and the walls of said chamber, a plurality of radially extending vanes bridging said annular space, a vapor circulating duct extending concentrically upward from said plate to a point above said distribution surface and terminating in a tangentially disposed nozzle proximate said chamber wall, the upwardly extending portion of said duct having a tangentially disposed intake opening therein arranged in circular opposition to said nozzle, a blower means disposed in said duct for driving gas therethrough from said intake opening to said nozzle to generate a vortex in said chamber, said chamber receiving said fluid crystal mixture above said perforate surface, a vapor exhaust member concentrically disposed in said chamber beneath and proximate the lower surface of said plate, a conveyor belt positioned within and traversing the lower portion of said chamber beneath said plate for collecting the crystals from said vortex in the form of a crystalline bed, and a mother liquor exhaust means including an exhaust pump communicative with the lower portion of said chamber beneath said belt for transmitting the mother liquor from said chamber through said intake heat exchangers in heat exchange relationship with the incoming aqueous solution to provide cooling thereof;

a drying enclosure connected to said separator means, said conveyor belt extending through said drying enclosure, a perforate horizontally disposed drum rotatably mounted in said enclosure and having a portion of said conveyor belt entrained thereover, a stationary semicircular trough concentrically disposed in said drum to block fluid flow through the portion of said drum which is not in engagement with the portion of said belt, means to supply at least a portion of the evaporant product of said refrigerant to said enclosure, and an intake means disposed within said trough to exhaust the evaporant product in said enclosure through the crystal bed and the portion of said belt engaging said drum for removal of residual mother liquor from between the crystals in said bed; a liquid exhaust means to withdraw mother liquor from said trough for transmission to the bottom of said separator means, and means including a pump and conduits communicating with the bottom of said enclosure and the upper portion of said separator means to withdraw and transmit liquid collecting in the bottom of said enclosure to the upper portion of said separator for recirculation therethrough;

a crystal washing means connected to said drying enclosure and comprising an upwardly sloping tunnel for receiving said conveyor belt, said tunnel divided into a pair of subchambers having means for collecting and spraying rinse water over the portion of said conveyor belt in the preceding chamber, one of said subchambers having means for spraying rinse water over a portion of the conveyor in said drying enclosure, a crystal melting means connected to said tunnel and constituting one of the terminal ends of said conveyor, said melting means comprising a pressure-tight vessel having a liquid refrigerant compressor means communicative therewith for liquefying and supplying the evaporant product of said refrigerant from said separator chamber and said drying enclosure, the heat of condensation of the liquefied refrigerant melting the crystals entering said vessel on said belt, the sweet water product from said crystals collecting in the lower portion of said vessel and the mixture of liquefied refrigerant and said pellets collecting in a separate stratified layer horizontally adjacent that of said sweet water, means for withdrawing sweet water from said vessel, means for withdrawing and cooling the mixture of liquefied refrigerant and pellets from said vessel for recirculation to said crystallization means, and a refrigerant gas condensing means for withdrawing, condensing and returning excess gaseous refrigerant from and to said vessel;

and means circulating said sweet water through said heat exchangers for cooling the incoming aqueous solution and through said gas condensing means for cooling of the gas being condensed therein.

9. An apparatus in accordance with claim 8 wherein at least one succeeding crystallization tray is interposed after the separator chamber corresponding to said first-mentioned crystallization tray and wherein the mother liquor exhaust means transmits said liquor from the chamber corresponding to said first-mentioned crystallization tray to the next succeeding tray, the next succeeding tray receiving a refrigerant-pellet mixture at a temperature substantially lower than that applied to the first-mentioned tray, and means to transmit the mother liquor collecting in the last of said separator chambers through said intake heat exchangers in heat exchange relationship with the incoming aqueous solution to provide cooling thereof.

10. An apparatus in accordance with claim 8 wherein said pressure-tight vessel comprises a downwardly sloping tunnel having a conveyor belt therein for conveying a bed of crystals therethrough, a plurality of rollers having transversely disposed paddles thereon disposed above said belt, the ends of said paddles engaging the surface crystals of the bed of crystals on said belt, and means to rotate said paddles to agitate and lift a portion of the crystals from said bed of crystals.

11. An apparatus in accordance with claim 8 wherein said gas condensing means comprises a plurality of gas-liquid condensers, each of said condensers having sweet water and gas inlets proximate the upper end thereof, a condensed gas outlet intermediate the upper and lower ends thereof and a sweet water exhaust proximate the lower end thereof, means including a condenser pump to transmit sweet water from said melting vessel through said condensers in series at a pressure corresponding to the liquid phase of the refrigerant at the temperature to which said refrigerant is cooled by the sweet water, a turbine connected to said condenser pump and disposed in the sweet water exhaust of the last of said condensers for removing work from the sweet water exhausted from the last of said condensers to power said pump, a gas stripper means for removing residual gas from the sweet water after exhaust thereof from said turbine, a condenser compressor means associated with each of said condensers, supply conduits between said melting vessel and each of said condenser compressors for transmitting a portion of the refrigerant gas withdrawn from said melting vessel to said condenser compressor means for compression to a pressure equivalent to the liquid phase thereof at the temperature to which said gas is cooled by the sweet water in the condenser corresponding to that compressor means, and transfer conduits transmitting compressed refrigerant gas between each compressor means and the condenser corresponding thereto, and a branch conduit communicating with the transfer conduit of the last of said condensers to withdraw excess uncondensible refrigerant gas therefrom, an independent heat exchanger, heat exchanger conduit transmitting a cooling solution through said independent heat exchanger, said branch conduit arranged to transmit the excess gas in heat exchange relationship with said cooling solution for cooling to a temperature corresponding to a liquid phase thereof, a stripping compressor means including conduits communicating with said gas stripper and with said independent heat exchanger for compressing the gas stripped from the sweet water in said stripper to a pressure equivalent to the liquid phase thereof at the temperature to which the gas is cooled in said independent heat exchanger and for transmission thereof to said independent heat exchanger for liquefication therein, and return means including a manifold and conduits for transmitting the liquefied gas output of said condensers and said independent heat exchanger to said melting vessel.

12. An apparatus in accordance with claim 8 wherein said liquid refrigerant exhaust and cooling means comprises an expansion chamber corresponding to each of said crystallization trays, means including an exhaust pump connecting said expansion chambers in series to said melting means for withdrawal and transmission of the liquid refrigerant-pellet mixture therein, the first of said expansion chambers receiving said mixture from said melting means for expansion thereof to a pressure equivalent to the desired temperature in the first of said trays and a first transmission means including a pump supplying a portion of the expanded mixture in the first of said expansion chambers to the first of said trays, the succeeding of said expansion chambers receiving a portion of the expanded mixture from the preceding expansion chamber thereto for further expansion thereof to pressures equivalent to the temperature desired in the tray corresponding thereto, and subsequent transmission means including a pump associated with each of the succeeding of said expansion chambers for supplying at least a portion of the further expanded refrigerant-pellet mixtures therein to the trays corresponding thereto, and recirculating means including a refrigerant compressor means for each of said coolers, said refrigerant compressor means withdrawing the gas product of evaporation from each of said coolers and compressing said gas to a pressure corresponding to the liquid state thereof, and a return conduit for returning the liquefied gas product of each of said refrigerant compressors to said melting vessel.

13. An apparatus in accordance with claim 8 wherein said washing means and melting means constitute a tunnel having endless conveying means therein, sealing means for separating said washing means into a plurality of chambers, said sealing means comprising rollers disposed in abutting relationship with the upper and lower surfaces of each of the runs of said belt, the rollers in abutment with the upper surface of the upper run of said belt having crystal accommodating recesses disposed therein to provide for passage of crystals thereby.

14. A process for separating water from an aqueous solution comprising the steps of:
  contacting the aqueous solution with an evaporating mixture less dense than said solution, said mixture including a substantially water immiscible organic fluid and inert pellets at a temperature less than the freezing point of water to initiate crystallization of the water therein about said pellets to form a crystalline-liquid slurry;
  increasing the size of the crystals and separating the resultant crystalline structure from the remaining fluids by entraining the slurry in a vortex formed by the evaporant product gas phase of said organic fluid;
  collecting said crystalline structure on a porous support;
  drying said crystalline structure by passing at least a portion of the evaporant product of said organic fluid through said support;
  washing said crystalline structure by passing sweet water through said support;
  liquefying said crystalline structure to obtain sweet water therefrom by condensing the evaporant product of said organic fluid and passing it through said support to impart the heat of condensation thereof to said crystalline structure;
  collecting said organic fluid, said nuclei and said sweet water in a reservoir for stratification according to the respective densities thereof;
  and separating the mixture of organic fluid and pellets from said sweet water by removing the constitutents from said reservoir at points coincident with their respective stratified dispositions.

15. A process of separating water from an aqueous solution as set forth in claim 14 wherein said pellets are precooled below the freezing point of water prior to being injected into the solution to initiate crystallization of water about said pellets.

16. A process of separating water from an aqueous solution as set forth in claim 14 wherein the separating of the crystals from the resultant slurry comprises the steps of generating a gas vortex with a vapor at a temperature below the freezing point of water, entraining the slurry in said vortex, maintaining said slurry entrained in said vortex to induce conglomeration and growth of the crystals, and removing the resultant crystals from said vortex.

17. A process of separating water from an aqueous solution comprising the steps of crystallizing the water in said solution by direct contact with an evaporating water immiscible organic fluid precooled below the freezing temperature of water to initiate crystallization thereof and form a crystal-mother liquor slurry, generating a gas vortex with the evaporant product of said refrigerant, entraining said slurry in said vortex, maintaining said slurry entrained in said vortex to induce conglomeration and growth of said crystals, removing the resultant crystals from said vortex, passing at least a portion of said evaporant product through the resultant crystals to remove residual mother liquor therefrom, and passing the evaporant product through said crystals to liquefy the evaporant by imparting the heat of condensation of the evaporant to the crystals, and thereby melting said crystals.

References Cited

UNITED STATES PATENTS

| | | | |
|---|---|---|---|
| 2,821,304 | 1/1958 | Zarchin | 62—123 X |
| 2,904,511 | 9/1959 | Donath | 210—59 |
| 3,170,779 | 2/1965 | Karnofsky | 62—58 |
| 3,251,192 | 5/1966 | Rich et al. | 62—58 |
| 3,292,386 | 12/1966 | Johnson et al. | 62—123 |

MICHAEL E. ROGERS, *Primary Examiner.*

U.S. Cl. X.R.

23—273; 62—58, 123; 210—205